United States Patent [19]

Igashira et al.

[11] Patent Number: 4,512,307
[45] Date of Patent: Apr. 23, 1985

[54] FUEL QUANTITY CONTROL APPARATUS OF SUPERCHARGED DIESEL ENGINE WITH SAFETY MEASURES

[75] Inventors: Toshihiko Igashira, Toyokawa; Hisasi Kawai; Takeshi Tanaka, both of Toyohashi; Kenzi Iwamoto, Nishio; Seiko Abe, Kariya; Eiji Hashimoto, Susono, all of Japan

[73] Assignees: Nippon Soken, Inc., Nishio; Toyota Jidosha Kabushiki Kaisha, Toyota, both of Japan

[21] Appl. No.: 398,712

[22] Filed: Jul. 15, 1982

[30] Foreign Application Priority Data

Jul. 18, 1981 [JP] Japan ............................ 56-111547

[51] Int. Cl.³ .................. F02D 1/04; F02M 39/00
[52] U.S. Cl. .................. 123/383; 123/198 D; 123/198 DB; 123/179 H
[58] Field of Search ............ 123/198 D, 383, 494, 123/198 DB, 179 H, 41.15

[56] References Cited

U.S. PATENT DOCUMENTS

| | | | |
|---|---|---|---|
| 3,385,940 | 5/1968 | Roper | 123/41.15 |
| 4,157,701 | 6/1979 | Holtrop et al. | 123/383 |
| 4,377,138 | 3/1983 | Mitani | 123/179 H |

Primary Examiner—Charles J. Myhre
Assistant Examiner—Carl Stuart Miller
Attorney, Agent, or Firm—Cushman, Darby & Cushman

[57] ABSTRACT

A fuel quantity control apparatus of a supercharged diesel engine with safety measures comprises a fuel injection pump capable of increasing the fuel quantity according to the degree of supercharging, a detector for detecting the temperature in a combustion chamber or the temperature of the exhaust gas, a control circuit receiving an output of the detector, and a three-way valve driven by the control circuit to control the amount of the increase of the fuel quantity. Through the use of the apparatus when the detected temperature reaches a predetermined abnormal temperature, the amount of increase of the fuel quantity can be made zero or decreased and accidents such as melting or damage of the engine by abnormal rise of the temperature in the combustion chamber or of the temperature of the exhaust gas can be prevented.

4 Claims, 5 Drawing Figures

FUEL QUANTITY CONTROL APPARATUS OF SUPERCHARGED DIESEL ENGINE WITH SAFETY MEASURES

BACKGROUND OF THE INVENTION

1. Field of the Invention

The present invention relates to a fuel quantity control apparatus of a supercharged diesel engine with safety measures.

2. Description of the Prior Art

In a supercharged diesel engine, the degree of supercharging is detected by the increase of the pressure in the air intake pipe, and the pressure in the air intake pipe is introduced into a boost compensator of a fuel injection pump to increase the amount of increase of the injected fuel quantity. The heat load of the diesel engine is increased by this increase of the fuel quantity and, hence, the wall temperature in the combustion chamber is elevated. If this temperature excessively elevates, however, it is liable to melt the combustion chamber wall or piston. Therefore, the above increase of the fuel quantity has to be stopped with a considerable safety margin and, hence, no satisfactory supercharging effect can be obtained.

When a turbocharger is used as the supercharging machine, the above-mentioned damage is liable to occur due to elevation of the temperature of the exhaust gas. Accordingly, the increase of the fuel quantity is controlled with considerable safety margin, and no satisfactory supercharging effect can be obtained. Reduction of the safety margin would increase the risk of the damage of the engine or turbocharger.

SUMMARY OF THE INVENTION

It is a primary object of the present invention to provide an apparatus in which the above-mentioned defects of the conventional apparatus are eliminated and in which the temperature in the combustion chamber or the temperature of the exhaust gas is detected and, when abnormally high, the amount of increase of the fuel quantity is made zero or decreased, whereby occurrence of accidents such as melting or damage of the engine by abnormal elevation of the temperature in the combustion chamber or the temperature of the exhaust gas is prevented. Another object of the present invention is to obtain a satisfactory supercharging effect in the normal state by adopting these safety measures.

In accordance with the present invention, there is provided a fuel quantity control apparatus of a supercharged diesel engine, which comprises a fuel injection pump capable of increasing the fuel quantity according to the degree of supercharging, means for detecting the temperature in a combustion chamber or the temperature of an exhaust gas, a control circuit receiving an output of said detecting means, and a three-way valve driven by said control circuit to control the amount of increase of the fuel quantity, wherein when the detected temperature reaches a predetermined abnormal temperature, the amount of increase of the fuel quantity is made zero or decreased.

DETAILED DESCRIPTION OF THE PREFERRED EMBODIMENTS

Figure 1:
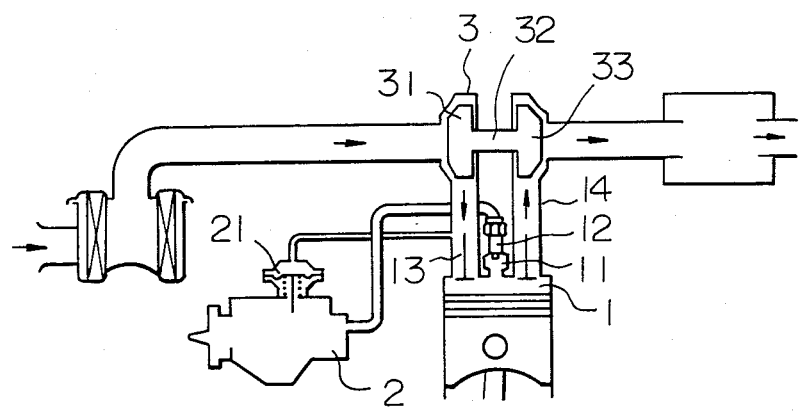
FIG. 1 is a diagram illustrating the structure of an ordinary supercharged diesel engine.

The general structure of a diesel engine provided with a turbocharger, to which the present invention is applied, will now be described with reference to FIGS. 1, 2, and 3. First, the structure of the entire system is explained with reference to FIG. 1. Diesel engine 1 is provided with subsidiary chamber 11. This subsidiary chamber 11 is provided with fuel injection nozzle 12 to which fuel is fed under pressure from fuel injection pump 2. Fuel injection pump 2 is driven by a crankshaft of diesel engine 1 at a half speed of the speed of the crankshaft. Boost compensator 21 is mounted on fuel injection pump 2 to increase the quantity of fuel according to the operation state of turbocharger 3. The pressure in air intake pipe 13 of diesel engine 1 is introduced into boost compensator 21. The open air is supplied to air intake pipe 13 through compressor 31 of turbocharger 3. Driving shaft 32 of compressor 31 is common to turbine 33, and compressor 31 is driven by turbine 33. Exhaust gas is introduced into turbine 33 through exhaust pipe 14 of diesel engine 1 to rotate turbine 33.

The structure of fuel injection pump 2 is now explained with reference to FIG. 2. Fuel injection pump 2 is of a Bosch VE-shape distribution type and is provided with boost compensator 21 of the diaphragm type. Namely, boost compensator 21 has diaphragm chamber 211 into which the pressure in air intake pipe 13 is introduced. When diaphragm 212 is vertically moved according to this pressure, control shaft 213 integrated with diaphragm 212 is vertically moved. As control shaft 213 is brought down, the allowable opening of governor lever 214 is increased and the maximum fuel supply quantity of fuel injection pump 2 is increased.

The structure of the combustion chamber of engine 1 is now described with reference to FIG. 3. Fuel injection nozzle 12 and glow plug 16 are arranged in subsidiary chamber 11.

Figure 2:
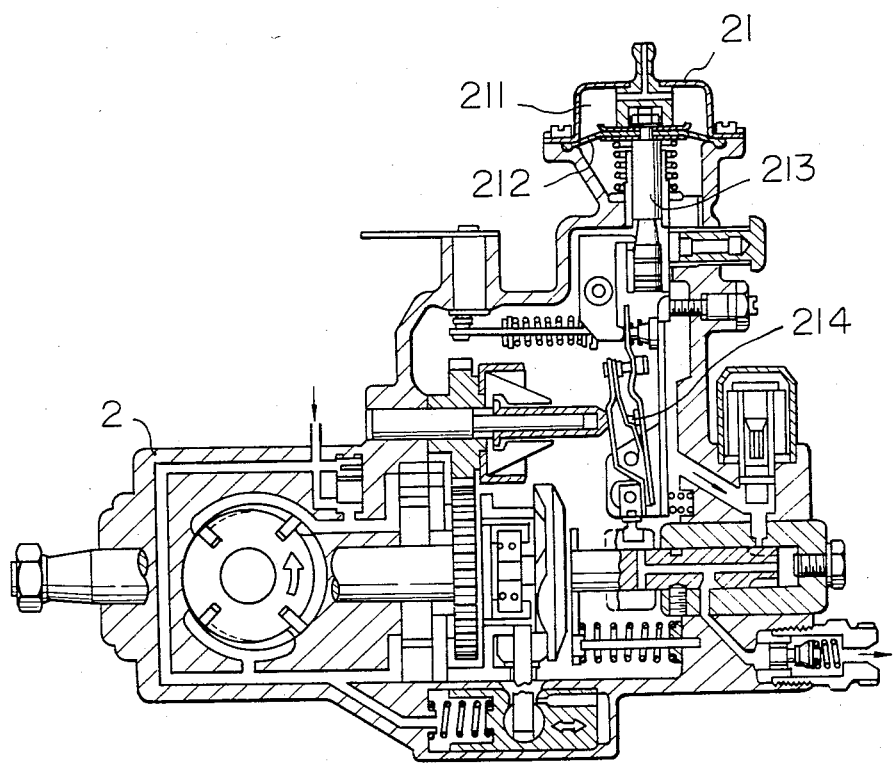
FIG. 2 is a diagram showing the structure of a fuel injection pump in the engine shown in FIG. 1.
Figure 3:
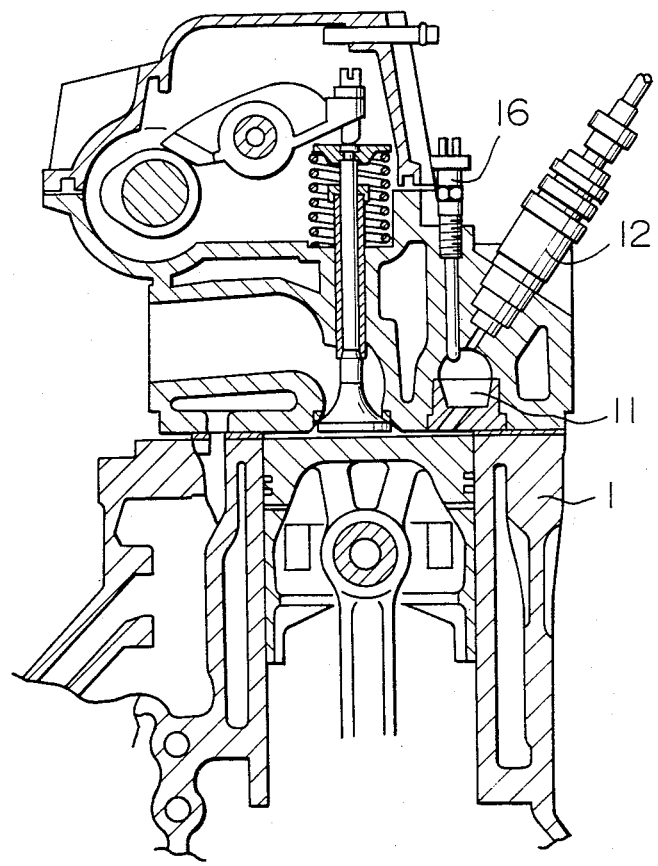
FIG. 3 is a diagram illustrating the structure of a combustion chamber in the engine shown in FIG. 1.

The above-mentioned structures shown in FIGS. 1, 2, and 3 are known and are described in detail, for example, in "Internal Combustion Engine" Volume 20, No. 247, March 1981, pages 9 through 16.

In the present invention, electromagnetic three-way valve 4 and control circuit 5 for controlling three-way valve 4 are additionally attached to the known system.

One embodiment of the fuel quantity control apparatus of a supercharged diesel engine with safety measures according to the present invention will now be described with reference to FIGS. 4 and 5. The heating element of glow plug 16 is formed of nickel (Ni) or platinum (Pt) and is characterized in that the value of the electric resistance is linearly changed according to the temperature. Control circuit 5 detects the electric resistance of glow plug 16. When the electric resistance exceeds the level corresponding to the temperature of 900° C., electricity is applied to electromagnetic three-way valve 4. Three-way valve 4 has three openings 41, 42, and 43. Opening 41 is communicated with air intake pipe 13, opening 42 is communicated with diaphragm chamber 211 of boost compensator 21, and opening 43 is communicated with the open air. Normally, in three-way valve 4 only opening 41 is communicated with opening 42. However, when electricity is applied to three-way valve 4, opening 42 is communicated with opening 43. Accordingly, although normally the pressure in air intake pipe 13 is introduced into diaphragm chamber 211 of boost compensator 21, atmospheric pressure is introduced into diaphragm chamber 211 only when electric current is supplied to electromagnetic three-way valve 4.

Control circuit 5 is arranged so that the electric resistance of glow plug 16 is detected only when electricity for generation of heat is not applied to glow plug 16.

Control circuit 5 will now be described. Input terminal 51 is connected to one end of glow plug 16. The other end of glow plug 16 is grounded. Input terminal 52 is connected to one end of relay coil 72. Input terminal 51 is connected to a negative pole of diode 55, and input terminal 52 is connected to a base of transistor 67 through resistor 66. Output terminal 53 is connected to one end of a coil of three-way valve 4. A positive pole of diode 55 is connected to one end of resistor 54 and a non-inverting input of differential amplifier 59. Constant voltage $V_c$ is applied to the other end of resistor 54 and one end of resistor 56. The other end of resistor 56 is connected to a positive pole of diode 57 and an inverting input of differential amplifier 59. A negative pole of diode 57 is connected to one end of resistor 58, and the other end of resistor 58 is grounded. An output of differential amplifier 59 is connected to a non-inverting input of comparator 60, and an inverting input of comparator 60 is connected to a variable terminal of variable resistor 61. Constant voltage $V_c$ is applied to one end of a fixed terminal of variable resistor 60, and the other end is grounded. An output of comparator 60 is connected to a base of transistor 64 through resistors 62 and 63. An emitter of transistor 64 is grounded, and a collector of transistor 64 is connected to output terminal 53 of control circuit 5. An emitter of transistor 67 is grounded, and a collector of transistor 67 is connected to a point of connection between resistor 62 and resistor 63. Resistor 68 is inserted between the base of transistor 67 and the ground. The base of transistor 64 is grounded through resistor 65.

The positive pole of battery 70 is connected to one end of switch 71 and one end of a contact of relay 72. The other end of switch 71 is connected to one end of a coil of relay 72. The other end of the coil of relay 72 is grounded, and the other end of the contact of relay 72 is connected to one end of glow plug 16. When switch 71 is turned on, relay 72 is actuated to red-heat glow plug 16. Namely, when switch 71 is turned on, relay 72 is actuated to close the contact of relay 72, whereby an electric current is caused to flow to glow plug 16 from battery 70 to red-heat glow plug 16. When glow plug 16 is thus red-heated, a starter is turned to start the engine. When the engine is started, switch 71 is turned off to stop application of electricity to glow plug 16.

The operation of control circuit 5 will now be described. It is supposed that no electricity is applied to glow plug 16 from relay 72. Glow plug 16 is attached to a first cylinder. Since the temperature of glow plug 16 is equal to the temperature in the first cylinder, the resistance value of the electric heating wire of glow plug 16 corresponds to the temperature in the first cylinder. A bridge circuit is constructed by resistor 54, diode 55, glow plug 16, resistor 56, diode 57, and resistor 58.

Diode 55 is disposed to prevent electric current from flowing from the contact of relay 72 toward control circuit 5 when relay 72 is actuated. Diode 57 is inserted to maintain the equilibrium of the bridge. The potential difference between the contact point of resistor 54 and diode 55 and the contact point of resistor 56 and diode 57 is amplified by differential amplifier 59. When the temperature in the first cylinder is elevated, the resistance value of glow plug 16 is increased, and therefore, the output voltage of differential amplifier 59 is increased. On the other hand, when the temperature in the first cylinder is lowered, the output voltage of differential amplifier 59 is reduced. Accordingly, voltage corresponding to the temperature in the first cylinder is produced at the output of differential amplifier 59. Comparator 60 compares set voltage $V_R$ corresponding to 900° C. with output voltage $V_X$ of differential amplifier 59. When a relation of $V_X \geq V_R$ is established, a high-level signal is produced at the outlet of comparator 60. When a relation of $V_X < V_R$ is established, a low-level signal is produced at the outlet of comparator 60. Accordingly, when the temperature in the first cylinder exceeds 900° C., a high-level signal is produced at the outlet of comparator 60, and transistor 64 is turned on to actuate three-way valve 4. When the output of comparator 60 is at a low level, transistor 64 is turned off and three-way valve 4 is not actuated.

When switch 71 is actuated, input terminal 52 of control circuit 5 is maintained at a high level, and transistor 67 is turned on. Accordingly, transistor 64 is turned off irrespective of the output of comparator 60 to stop the operation of three-way valve 4.

While glow plug 16 is exerting the inherent action of generating heat, control circuit 5 is not actuated. The electric circuit for generation of heat in glow plug 16 is known and is of no substantial significance in the present invention. Therefore, explanation of this circuit is omitted. When application of electricity for generation of heat to glow plug 16 is stopped, control circuit 5 begins to detect the electric resistance value of glow plug 16. The temperature of glow plug 16 is normally 500° C. to 800° C. Detecting the electric resistance corresponding to this temperature, control circuit 5 does not energize electromagnetic three-way valve 4. Accordingly, the pressure in air intake pipe 13 is introduced into diaphragm chamber 211 of boost compensator 21. If turbocharger 3 exerts the supercharging effect, the pressure in air intake pipe 13 becomes higher than the atmospheric pressure, and diaphragm 212 brings down control shaft 213. Accordingly, the allowable opening of governor lever 214 is increased to allow the increase of the fuel quantity. When high-load operation is continued for too long a time or when the fuel quantity is excessively increased because of an error in adjustment of the fuel pump or a change with the lapse of time, the combustion temperature is abnormally elevated. When the temperature of glow plug 16 exceeds 900° C., it is decided that the risk of melting of the combustion chamber wall is increased. Control circuit 5 starts application of electricity to electromagnetic three-way valve 4 when the reisistance value of glow plug 16 exceeds the level corresponding to 900° C. Accordingly, the pressure in diaphragm chamber 211 of boost compensator 21 is made equal to atmospheric pressure, and control shaft 213 is raised up, with the result that the allowable opening of governor lever 214 is decreased and the amount of increase of the quantity of the fuel is made zero (or decreased). Thus, turbocharger 3 or engine 1 is prevented from being damaged. When the temperature of glow plug 16 falls below 900° C., the increase of the fuel quantity is started again.

Figure 4:
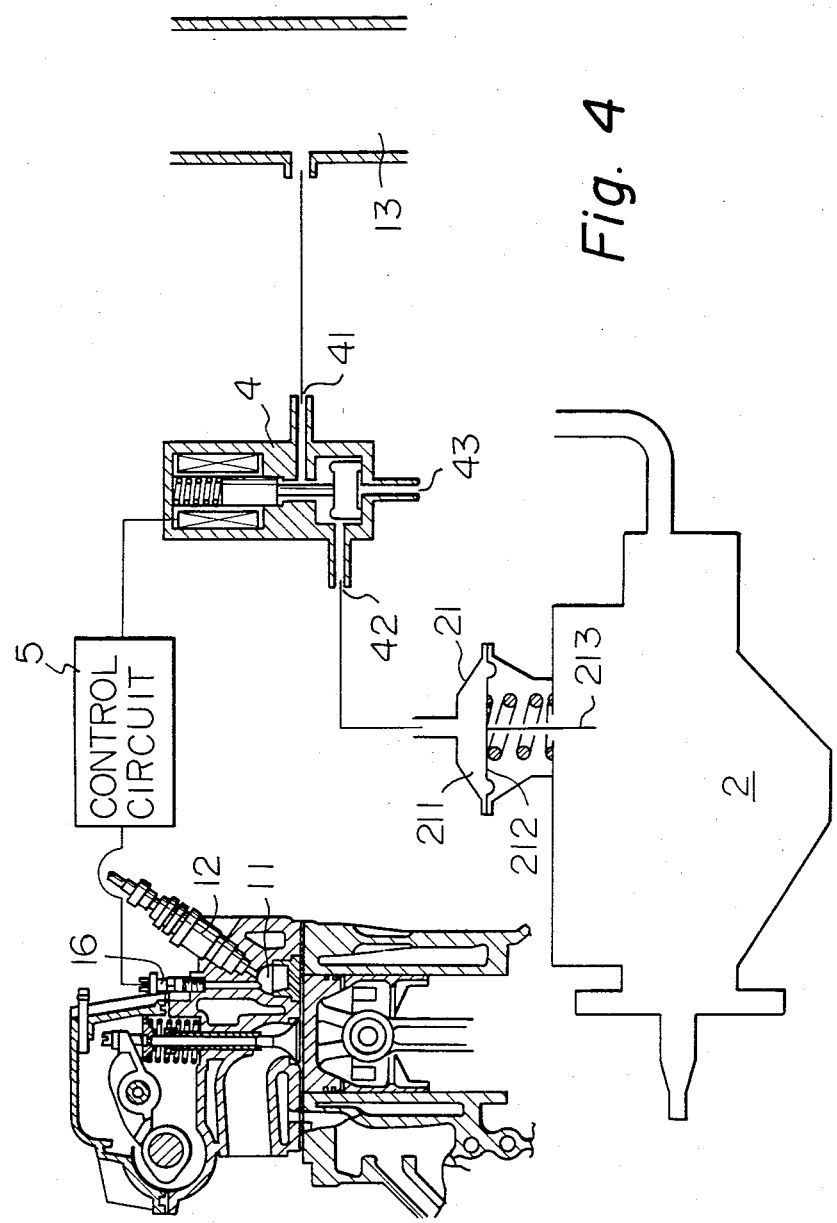
FIG. 4 is a diagram illustrating a fuel quantity control apparatus of a supercharged diesel engine with safety measures according to one embodiment of the present invention.
Figure 5:
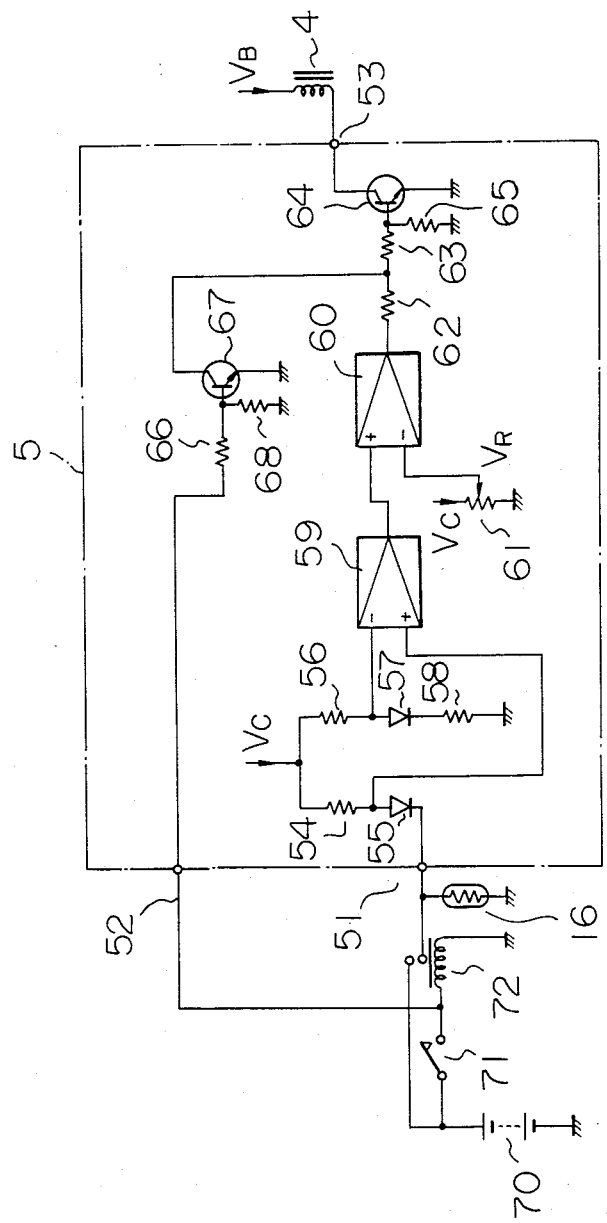
FIG. 5 is a circuit diagram illustrating a control circuit in the apparatus shown in FIG. 4.

In the apparatus shown in FIG. 4, the temperature in the combustion chamber is detected by utilizing the change of the electric resistance value of the glow plug. This apparatus is advantageous in that no particular temperature-detecting means need be disposed.

In carrying out the present invention, various modifications may be made to the above-mentioned embodiment. For example, although the change of the electric resistance of the glow plug according to the temperature is utilized for detecting the temperature in the apparatus shown in FIG. 4, there may be adopted a simpler method in which elevation of the temperature is detected by utilizing the characteristic property of the glow plug that the glow plug is caused to break at a dangerous temperature. In this case, the manufacturing cost of the apparatus can be reduced.

In the apparatus shown in FIG. 4, the temperature in the combustion chamber is detected by the change of the electric resistance or breaking of the glow plug. However, as is apparent to those skilled in the art, the temperature in the combustion chamber can also be detected by a sensor disposed separately, such as a thermistor or a posistor. Furthermore, from the foregoing description, it will readily be understood that a sensor as described above may be arranged on the exhaust gas side. For example, when a sensor comprising a posistor is arranged on the exhaust gas side, the posistor sensor is connected instead of glow plug 16 in the control circuit 5 shown in FIG. 5. In this case, the signal from the glow plug-driving relay and transistor 67 and resistors 66 and 68 become unnecessary.

We claim:

1. A fuel quantity control apparatus for a supercharged diesel engine, having a glow plug, an electric circuit for preheating the glow plugs and a fuel injection pump capable of increasing the fuel quantity according to the degree of supercharging, said apparatus comprising:

means for detecting at least an abnormal temperature by measuring the electric resistance of the glow plug using a bridge circuit including a diode provided to electrically separate said bridge circuit from said electric circuit for the preheating of the glow plug, a control circuit for receiving the output of the detection means, and a three-way valve driven by the control circuit and for controlling the amount of increase of the fuel quantity, whereby when the abnormal temperature is detected by the detection means, the amount of increase of the fuel quantity is made zero or decreased.

2. An apparatus as set forth in claim 1, wherein the fuel injection pump is provided with a boost compensator and the three-way valve is an electromagnetic three-way valve capable of releasing a part of all of the intake air pressure introduced into the boost compensator.

3. An apparatus as set forth in claim 1, wherein when the supply of the electric current to the glow plug for heating is completed, the control circuit starts to detect the electric resistance of the glow plug.

4. An apparatus as claimed in claim 2, wherein when the supply of the electric current to the glow plug for heating is completed, the control circuit starts to detect the electric resistance of the glow plug.

* * * * *